United States Patent
Batchko et al.

(10) Patent No.: US 9,442,225 B2
(45) Date of Patent: Sep. 13, 2016

(54) FLUIDIC LENS WITH MANUALLY-ADJUSTABLE FOCUS

(71) Applicant: Holochip Corporation, Hawthorne, CA (US)

(72) Inventors: Robert G. Batchko, Santa Monica, CA (US); Andrei Szilagyi, Rancho Palos Verdes, CA (US)

(73) Assignee: HOLOCHIP CORPORATION, Hawthorne, CA (US)

( * ) Notice: Subject to any disclaimer, the term of this patent is extended or adjusted under 35 U.S.C. 154(b) by 0 days.

(21) Appl. No.: 14/196,976

(22) Filed: Mar. 4, 2014

(65) Prior Publication Data

US 2014/0313590 A1    Oct. 23, 2014

Related U.S. Application Data

(63) Continuation of application No. 13/113,985, filed on May 23, 2011, now Pat. No. 8,665,527, which is a continuation of application No. 12/758,751, filed on Apr. 12, 2010, now Pat. No. 7,948,683, which is a (Continued)

(51) Int. Cl.
*G02B 3/12* (2006.01)
*G02B 3/14* (2006.01)
*G02B 26/00* (2006.01)

(52) U.S. Cl.
CPC . *G02B 3/12* (2013.01); *G02B 3/14* (2013.01); *G02B 26/005* (2013.01)

(58) Field of Classification Search
CPC ........ G02B 3/12; G02B 3/14; G02B 26/004; G02B 26/005

USPC ................ 359/665–667; 351/159.34, 159.68
See application file for complete search history.

(56) References Cited

U.S. PATENT DOCUMENTS

| 696,788 A | 4/1902 | Allen |
| 2,300,251 A | 10/1942 | Flint |

(Continued)

FOREIGN PATENT DOCUMENTS

| EP | 1925963 | 5/2008 |
| EP | 2034338 | 3/2009 |

(Continued)

OTHER PUBLICATIONS

Final Office Action dated Jan. 22, 2009 for U.S. Appl. No. 11/383,216.

(Continued)

*Primary Examiner* — Darryl J Collins
(74) *Attorney, Agent, or Firm* — Joshua D. Isenberg; JDI Patent

(57) ABSTRACT

A fluidic lens may have a reservoir at least partially bounded by a first optical surface and a second optical surface. A fluid fills a volume of the reservoir. A piston is configured to contact a portion of the first or second optical surface from outside the reservoir. One or more of the first optical surface or second optical surface is configured to deform as a result of a change in a pressure applied to the fluid or a change in contact between the piston and the first or second optical surface. A rim is configured to contact a portion of the first or second optical surface from outside the reservoir. One or more of the first optical surface or second optical surface is configured to deform as a result of a change in a pressure applied to the fluid or a change in contact between the rim and the first or second optical surface.

16 Claims, 6 Drawing Sheets

Related U.S. Application Data continuation of application No. 12/117,625, filed on May 8, 2008, now Pat. No. 7,697,214, which is a continuation-in-part of application No. 11/747,845, filed on May 11, 2007, now Pat. No. 7,672,059, and a continuation-in-part of application No. 11/383,216, filed on May 14, 2006, now Pat. No. 7,646,544.

(60) Provisional application No. 60/916,739, filed on May 8, 2007, provisional application No. 60/747,181, filed on May 12, 2006, provisional application No. 60/723,381, filed on Oct. 3, 2005, provisional application No. 60/703,827, filed on Jul. 29, 2005, provisional application No. 60/683,072, filed on May 21, 2005, provisional application No. 60/680,632, filed on May 14, 2005.

(56) References Cited

U.S. PATENT DOCUMENTS

| | | |
|---|---|---|
| 2,504,039 A | 4/1950 | O'Leary |
| 3,161,718 A | 12/1964 | De Luca |
| 4,261,655 A | 4/1981 | Honigsbaum |
| 4,289,379 A | 9/1981 | Michelet |
| 4,444,471 A | 4/1984 | Ford, Jr. et al. |
| 4,466,706 A | 8/1984 | Lamothe, II |
| 4,514,048 A | 4/1985 | Rogers |
| 4,783,155 A | 11/1988 | Imataki et al. |
| 4,784,479 A | 11/1988 | Ikemori |
| 4,802,746 A | 2/1989 | Baba |
| 4,890,903 A | 1/1990 | Treisman et al. |
| 4,892,396 A | 1/1990 | Kushibiki et al. |
| 4,913,536 A * | 4/1990 | Barnea .................. 359/666 |
| 5,138,494 A | 8/1992 | Kurtin |
| 5,672,001 A | 9/1997 | Bertling et al. |
| 5,774,273 A | 6/1998 | Bornhorst |
| 5,973,852 A | 10/1999 | Task |
| 6,081,388 A | 6/2000 | Widl |
| 6,130,705 A | 10/2000 | Lareau |
| 6,288,767 B1 | 9/2001 | Murata et al. |
| 6,369,954 B1 | 4/2002 | Berge et al. |
| 6,542,309 B2 | 4/2003 | Guy |
| 6,618,208 B1 | 9/2003 | Silver |
| 6,860,601 B2 | 3/2005 | Shadduck |
| 7,068,439 B2 | 6/2006 | Esch et al. |
| 7,072,086 B2 | 7/2006 | Batchko |
| 7,142,369 B2 | 11/2006 | Wu et al. |
| 7,218,429 B2 | 5/2007 | Batchko |
| 7,218,430 B2 | 5/2007 | Batchko |
| 7,359,124 B1 | 4/2008 | Fang et al. |
| 7,369,321 B1 | 5/2008 | Ren et al. |
| 7,369,723 B1 | 5/2008 | Mescher |
| 7,374,301 B1 | 5/2008 | Simmers |
| 7,440,193 B2 | 10/2008 | Gunasekaran et al. |
| 7,453,646 B2 | 11/2008 | Lo |
| 7,612,948 B2 | 11/2009 | Immink et al. |
| 7,646,544 B2 | 1/2010 | Batchko et al. |
| 7,672,059 B2 | 3/2010 | Batchko et al. |
| 7,697,214 B2 | 4/2010 | Batchko et al. |
| 7,755,840 B2 | 7/2010 | Batchko et al. |
| 7,813,047 B2 | 10/2010 | Wang et al. |
| 7,948,683 B2 | 5/2011 | Batchko et al. |
| 8,064,132 B1 | 11/2011 | Leblanc |
| 8,064,142 B2 | 11/2011 | Batchko |
| 8,503,875 B2 | 8/2013 | Szilagyi et al. |
| 8,605,361 B2 | 12/2013 | Batchko et al. |
| 8,665,527 B2 | 3/2014 | Batchko et al. |
| 2002/0154380 A1 | 10/2002 | Gelbart |
| 2004/0082993 A1 | 4/2004 | Woods |
| 2004/0240076 A1 | 12/2004 | Silver |
| 2004/0262645 A1 | 12/2004 | Huff et al. |
| 2005/0030438 A1 | 2/2005 | Nishioka |
| 2005/0041301 A1 | 2/2005 | Kibayashi |
| 2006/0077562 A1 | 4/2006 | Silver |
| 2006/0088514 A1 | 4/2006 | O'Mahony et al. |
| 2006/0126190 A1 | 6/2006 | Berge et al. |
| 2006/0164731 A1 | 7/2006 | Wu et al. |
| 2007/0026329 A1 | 2/2007 | Wu |
| 2007/0030573 A1 | 2/2007 | Batchko et al. |
| 2007/0201138 A1 | 8/2007 | Lo |
| 2007/0211207 A1 | 9/2007 | Lo et al. |
| 2007/0263293 A1 | 11/2007 | Batchko et al. |
| 2008/0112059 A1 | 5/2008 | Choi et al. |
| 2008/0144185 A1 | 6/2008 | Wang |
| 2008/0218873 A1 | 9/2008 | Batchko |
| 2008/0225379 A1 | 9/2008 | Mescher |
| 2008/0231963 A1 | 9/2008 | Batchko |
| 2008/0239503 A1 | 10/2008 | Conradi et al. |
| 2008/0259463 A1 | 10/2008 | Shepherd |
| 2008/0285143 A1 | 11/2008 | Batchko et al. |
| 2008/0285146 A1 | 11/2008 | Shirasuna et al. |
| 2009/0002838 A1 | 1/2009 | Yokoyama et al. |
| 2009/0021823 A1 | 1/2009 | Heim et al. |
| 2009/0040361 A1 | 2/2009 | Heim et al. |
| 2009/0052049 A1 | 2/2009 | Batchko et al. |
| 2009/0195882 A1 | 8/2009 | Bolle et al. |
| 2010/0103542 A1 | 4/2010 | Yasuda |
| 2010/0118413 A1 | 5/2010 | Kim et al. |
| 2010/0118414 A1 | 5/2010 | Bolis |
| 2010/0231783 A1 | 9/2010 | Büeler |
| 2010/0232031 A1 | 9/2010 | Batchko et al. |
| 2010/0232161 A1 | 9/2010 | Aschwanden |
| 2011/0007161 A1 | 1/2011 | Batchko et al. |
| 2011/0261466 A1 * | 10/2011 | Buch et al. .................. 359/666 |
| 2011/0267703 A1 | 11/2011 | Batchko et al. |
| 2013/0176628 A1 | 7/2013 | Batchko et al. |

FOREIGN PATENT DOCUMENTS

| | | |
|---|---|---|
| EP | 2238952 | 10/2010 |
| EP | 2239600 | 10/2010 |
| GB | 1327503 | 8/1973 |
| JP | 1166003 | 6/1989 |
| JP | 1166004 | 6/1989 |
| JP | 11133210 | 5/1999 |
| JP | 2000081504 A | 3/2000 |
| JP | 10144975 | 5/2008 |
| WO | 9918456 | 4/1999 |
| WO | 2008018387 | 2/2008 |
| WO | 2008138010 | 11/2008 |
| WO | 2010015093 | 2/2010 |
| WO | 2010015095 | 2/2010 |

OTHER PUBLICATIONS

Final Office Action dated Sep. 17, 2007 for U.S. Appl. No. 12/117,625 entitled "Fluidic Lens With Manually-Adjustable Focus".

Final Office Action for U.S. Appl. No. 12/828,192 dated Sep. 14, 2011.

Hongwen Ren et al. "Variable-Focus Liquid Lens by Changing Aperature", Applied Physics Letters, vol. 86, No. 21107, May 17, 2005, p. 211107-1-211107-3.

International Search Report and Written Opinion of the International Searching Authority dated Aug. 8, 2008—International Patent Application No. PCT/US08/63122.

J. Chen et al.,"Variable-Focusing Microlens with Microfluidic Chip", J. Micromech. Microeng. 14,p. 675-680,2004.

Non-final Office Action dated Sep. 21, 2009 for U.S. Appl. No. 11/928,376 entitled "Fluidic Optical Devices".

Notice of Allowance and Fee(s) Due dated Nov. 16, 2009 issued for U.S. Appl. No. 11/928,076.

Notice of Allowance and Fee(s) Due dated Apr. 9, 2009 for U.S. Appl. No. 11/383,216, 6 pages.

Notice of Allowance and Fee(s) Due dated Nov. 20, 2009 issued for U.S. Appl. No. 12/117,625.

Notice of Allowance and Fees Due dated Feb. 22, 2010 for U.S. Appl. No. 11/928,376.

Non-Final Office Action for U.S. Appl. No. 13/598,539, dated Dec. 5, 2014.

(56) References Cited

OTHER PUBLICATIONS

Office Action dated Feb. 15, 2011 for U.S. Appl. No. 12/706,637.
Office Action dated Mar. 5, 2009 for U.S. Appl. No. 11/928,216.
Office Action dated Apr. 28, 2009 for U.S. Appl. No. 12/117,625, 6 pages.
S. Perichon et al. "Stretchable Gold Conductors on Elastomeric Substrate", Applied. Physics. Letter, vol. 82, No. 15, p. 2404-2406, Apr. 14, 2003.
Office Action dated Apr. 28, 2009 for U.S. Appl. No. 12/117,625.
Office Action dated Feb. 4, 2011 issued for U.S. Appl. No. 12/828,192.
Office Action dated Jul. 23, 2008 for U.S. Appl. No. 11/747,845, 9 pages.
Office Action dated Jun. 12, 2008 for U.S. Appl. No. 11/383,216, 22 pages.
Office Action dated Oct. 22, 2008 for U.S. Appl. No. 11/928,076, 8 pages.
Office Action dated Sep. 21, 2009 for U.S. Appl. No. 11/928,376.
Notice of Allowance for U.S. Appl. No. 13/598,539, dated Jun. 8, 2015.

* cited by examiner

FLUIDIC LENS WITH MANUALLY-ADJUSTABLE FOCUS

Actuated fluidic lens structures are described in commonly owned patent applications. These include U.S. Pat. No. 7,646,544 and U.S. Pat. No. 7,627,059, both of which are incorporated herein by reference, and U.S. Provisional Patent Applications 60/680,632, 60/683,072, 60/703,827, 60/723,381, and 60/747,181, the entire disclosures of which are incorporated herein by reference. The predecessor of the present family of devices is a fluid-filled chamber capable of squeezing transparent fluid into a centrally-disposed elastic-membrane-delimited lens. Pressurization of the fluid causes the membranes to bulge, thereby controllably altering the optical power of the lens. The elastic energy of the membranes provides the restoring force which prevails, once the actuating force is diminished.

FIELD OF THE INVENTION

This invention relates generally to optics. More particularly, it relates to fluidic optical devices.

BACKGROUND

It is within this context that embodiments of the present invention arise.

SUMMARY OF THE INVENTION

According to embodiments of the present invention a fluidic lens may have a transparent window member; a transparent distensible membrane; an inner ring between the transparent window member and the membrane; a layer of liquid stored between the window member, the inner ring and the membrane; and a piston ring disposed such that the membrane is between the piston ring and the inner ring. The piston ring may be adapted to apply a liquid displacement force to the membrane in a direction perpendicular to a plane of an aperture of the inner ring to cause a change in a radius of curvature of the membrane.

The piston ring may be characterized by an aperture radius and an annular thickness, wherein the annular thickness is greater than about 20%, 40%, 60%, 80%, or 100% of the annular radius.

The inner ring may have a conic frustum shaped inner surface characterized by a half angle. The outer ring may also have a conic frustum shaped outer surface characterized by a half angle that is substantially the same as the half angle for the inner surface of the inner ring.

An outer edge of the piston ring may be threaded. A surrounding structure may be adapted to receive the inner ring, membrane and piston ring, the surrounding structure having inner threads that mate with the threads at the outer edge of the piston ring.

DETAILED DESCRIPTION

As discussed above, actuated fluidic lens structures described in commonly owned patent applications may be based on a fluid-filled chamber capable of squeezing transparent fluid into a centrally-disposed elastic-membrane-delimited lens. Pressurization of the fluid causes the membranes to bulge, thereby controllably altering the optical power of the lens. The elastic energy of the membranes provides the restoring force which prevails, once the actuating force is diminished. Embodiments of the present invention are related to a family of fluidic optical devices with expanded applicability.

Figure 1:
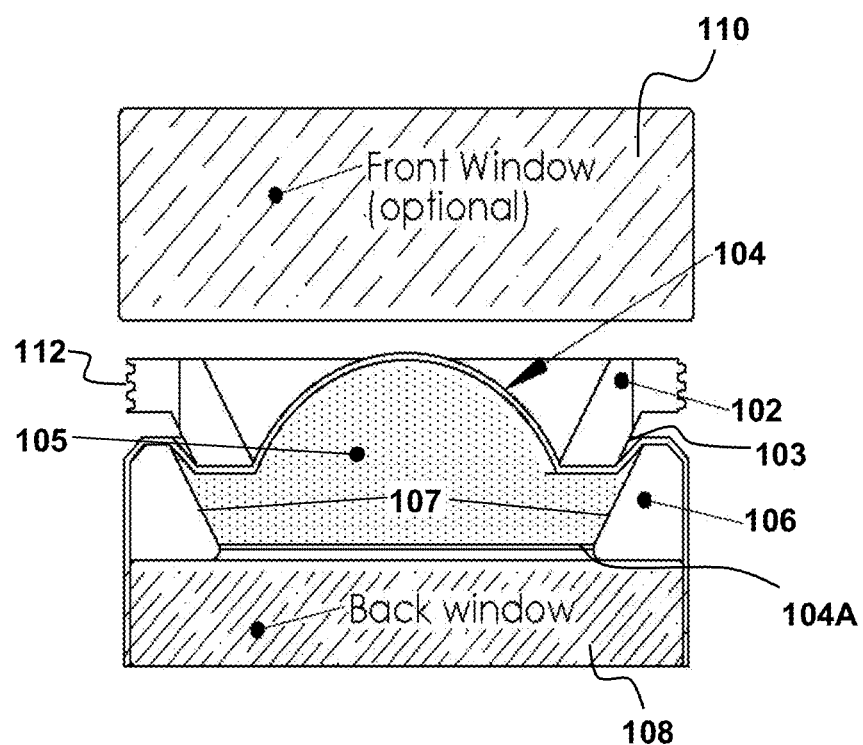
FIG. 1 is a cross-sectional diagram of a fluidic lens according to an embodiment of the present invention.

A cross section of an embodiment of the present device structure is illustrated in FIG. 1. A fluidic lens 100 may comprise a ring shaped piston (piston ring or top ring) 102 that indents the surface of a transparent membrane 104 which separates an inner space filled with a liquid 105 from ambient air. Displacement of the liquid 105—the liquid being essentially incompressible—causes a central portion of the membrane 104 to bulge outwardly into an energy-minimizing shape. In the case of a thin membrane, the stretching of the membrane is associated with an increase in hydrostatic pressure, for which the energy minimizing shape is a simple spherical cap as seen in FIG. 1.

An immovable portion of the membrane 104 may be anchored between an Outer Ring (not shown) and an Inner Ring 106. The inner ring 106 has an inner surface that provides a lateral boundary for the refractive fluid. In some embodiments, the Inner Ring 106 may include one or more reservoirs in fluid communication with an aperture region of fluidic lens 100. Examples of such configurations are described, e.g., in US Patent Application Publication 20070030573 and US Patent Application Publication 20070263292, both of which are incorporated herein by reference. As shown in FIG. 1, the inner ring 106 may have a conic-frustum inner surface 107, which forms a lateral boundary of the refractive fluid 105. The top ring 102 may have an outer edge with a conic-frustum surface 103. The remaining fluid boundary may be provided by a Back Window 108. In co-pending patent application Ser. No. 11/383,216 (Published as US Patent Application Publication 20070030573), the Back Window is sometimes referred to as a Round Blank. The Membrane 104 may extend over an edge of the Back Window 108 as seen in FIG. 1. The Membrane 104 may be mechanically secured and hermetically sealed to the Back Window 108, e.g., by an adhesive.

It will be clear to one skilled in the art that the above embodiment may be altered in many ways without departing from the scope of the invention. For example, the Back Window 108 (or at least a portion thereof) may be made of a deformable, e.g., elastomeric or deformable polymer material and may act as a second membrane in a manner similar to the transparent membrane 104. Alternatively, the Fluidic Lens 100 may include an optional back Membrane 104A. Examples of such configurations are described, e.g., in US Patent Application Publication 20070030573 and US Patent Application Publication 20070263292, both of which are incorporated herein by reference.

In some embodiments, the Inner Ring 106 may be made of a rigid material, such as a metal or rigid polymer. Alternatively, in some embodiments, the Inner Ring 106 (or at least a portion thereof) may be made of a deformable material, e.g., an elastomer or deformable polymer. If the Inner Ring 106 is deformable, an outer diameter of the Top Ring 102 may be sufficiently large compared to the outer diameter of the Inner Ring 106 that the Top Ring 102 may press upon and deform the Inner Ring 106, thereby exerting a displacement force on the Liquid 105. By way of example, the Outer Diameter of the Top Ring 102 may be equal to or greater than the Outer diameter of the Inner Ring 106. If the Inner Ring 106 includes a reservoir, some of the Liquid 105 may be expelled from the reservoir into the aperture region of the Fluidic Lens 100 when the Top Ring 102 presses upon the Inner Ring 106, thereby causing a displacement of the Membrane 104.

Also shown in FIG. 1, is an optional Front Window 110. In a practical implementation, this front Window 110 may serve a number of functions, such as mechanical protection of the elastomeric membrane, wavelength or polarization filtering, additional fixed refraction, etc. Such functions may alternatively be performed by the Back Window 108.

Another feature visible in FIG. 1 is the presence of lead screw threads 112 around the outer edges of the Top Ring 102. These threads 112 may be configured to mate to corresponding threads on an inner edge of a surrounding structure (not shown). When the Top Ring 102 is rotated relative to the surrounding structure (or vice versa), the mating threads on the surrounding structure (not shown) cause the ring to advance or recede against the membrane 104, thus adjusting the optical power of the fluidic lens 100.

The membrane 104 should be capable of stretching elastically, should be durable enough to have a lifetime suitable for its application. For example, in a cell phone camera application the membrane 104 should have a lifetime of several years and move than about one million cycles of operation. By way of example, and without limitation, the membrane 104 may be made of a silicone-based polymer such as poly(dimethylsiloxane) also known as PDMS or a polyester material such as PET or Mylar™ (biaxially-oriented polyethylene terephthalate). It is noted that if the fluid 105 and membrane 104 have sufficiently similar refractive indices, or include a suitable optical coating, scattering of light at their interface can be significantly reduced.

Examples of suitable materials for the membrane and refractive fluid as well as examples of various schemes for actuating the Piston Ring are described, e.g., in US Patent Application Publication 20070030573, which has been incorporated herein by reference. Among possible actuator solutions described therein are shape memory alloy (SMA) actuators, Electroactive Polymer (EAP) actuators also known as Electroactive Polymer Artificial Muscle (EPAM) actuators, electrostatic actuators, piezoelectric actuators, stepper motor, voice coil or other forms of motor actuators and electromagnetic (EM) actuators. In addition, certain forms of electrostatic actuator are described in U.S. Patent Application Publication US Patent Application Publication 20070263293, which has been incorporated herein by reference.

By way of example, the fluid 105 may be silicone oil (e.g., Bis-Phenylpropyl Dimethicone). Additionally, fluid 105 may include fluorinated polymers such as perfluorinated polyether (PFPE) inert fluid. One example of a PFPE fluid is Fomblin® brand vacuum pump oil manufactured by Solvay Solexis of Bollate, Italy. The chemical chains of PFPE fluids such as Fomblin include fluorine, carbon and oxygen and have desirable properties including low vapor pressure, chemical inertness, high thermal stability, good lubricant properties, no flash or fire point, low toxicity, excellent compatibility with metals, plastics and elastomers, good aqueous and non-aqueous solvent resistance, high dielectric properties, low surface tension, good radiation stability and are environmentally acceptable.

Calculation of Membrane Shape

In the design of a fluidic lens of embodiments of the present invention it is useful to be able to relate the stroke d of the Top Ring to the resulting membrane curvature, R. In the thin membrane approximation, the desired formula may obtained from equating the volume pushed-in by the piston to the volume of the bulging membrane. The resulting equation is:

$$d(R, r_1) := \frac{\left(R - \sqrt{R^2 - r_1^2}\right)^2 \cdot \left(2 \cdot R + \sqrt{R^2 - r_1^2}\right)}{(r_1 + w)^2 + (r_1 + w) \cdot r_i + r_i^2} \quad \text{Eq. 1}$$

Figure 2:
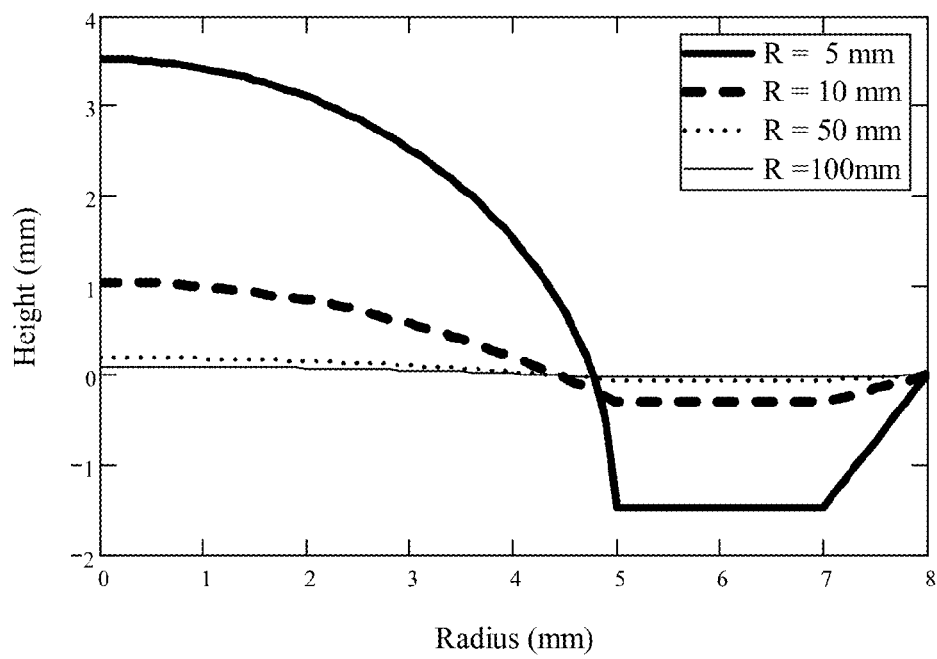
FIG. 2 is a graph depicting membrane profiles for various radii of curvature for a fluidic lens according to an embodiment of the present invention.

Where:
d=piston stroke
R=membrane curvature
$r_1$=lens radius (clear aperture)
$r_i$=radius of membrane anchor (Inner Ring)
w=radial width of piston portion of Top Ring With this, the profile of the membrane may be plotted for various radii of curvature, as in FIG. 2. This profile is applicable as long as radius of the membrane anchor is larger than the outer piston radius ($r_1$+w). Although this provides much design latitude, in practice, such a device may need to be operated near the elastic limit of the membrane.

Strain Balancing

To make design latitude as great as possible, it is desirable to balance the strain in the inner (lens) and the outer (conical portion) regions of the membrane.

When the strain in the spherical cap is set equal to the strain in the conically-shaped outer portion of the membrane, the ratio x of the membrane outer radius $r_i$ to the inner radius $r_1$ becomes constrained by the following equation:

$$x(a, \rho) := [(1 + a)^3 + \text{Rho}(\rho)]^{\frac{1}{3}} \quad \text{Eq. 2}$$

where:

$$x = \frac{r_i}{r_1} \quad a = \frac{w}{r_1} \quad \rho = \frac{R}{r_1}$$

$$\text{Rho}(\rho) := \frac{\left(\rho - \sqrt{\rho^2 - 1}\right)^2 \cdot \left(2 \cdot \rho + \sqrt{\rho^2 - 1}\right)}{\sqrt{\left(\rho \cdot a\sin\left(\frac{1}{\rho}\right)\right)^2 - 1}}$$

The function Rho is fairly constant as the dimensionless radius of curvature varies, except where R approaches $r_1$, i.e. the spherical cap approaches a hemispherical shape. This behavior of Rho($\rho$) is illustrated in FIG. 3.

The asymptotic value of Rho is given by:

$$\lim_{\rho \to \infty} \text{Rho}(\rho) \to \frac{3}{4} \cdot 3^{\frac{1}{2}} = 1.299 \quad \text{Eq. 3}$$

Figure 3:
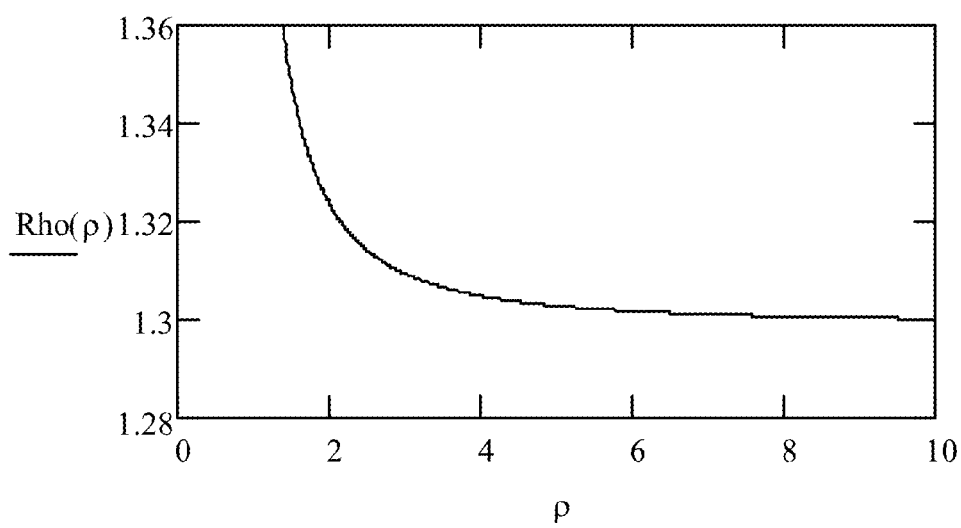
FIG. 3 is a graph illustrating an effect of radius of curvature on strain balancing in a fluidic lens membrane according to an embodiment of the present invention.

As can be seen from FIG. 3, the asymptotic value may be used with less than 2% error for dimensionless radii of curvature down to about 2. The other extreme is given by:

$$\text{Rho}(1) \rightarrow \frac{4}{(\pi^2 - 4)^{\frac{1}{2}}} = 1.651 \qquad \text{Eq. 4}$$

These two extremes may be reflected in the strain balancing (Equation 2):

$$x0(a) := \left[(1+a)^3 + \frac{3\sqrt{3}}{4}\right]^{\frac{1}{3}} \qquad \text{Eq. 5a}$$

$$x1(a) := \left[(1+a)^3 + \frac{4}{(\pi^2 - 4)^{\frac{1}{2}}}\right]^{\frac{1}{3}} \qquad \text{Eq. 5b}$$

To see graphically the effect of these strain balancing choices on fluid lens design, the dimensionality of the membrane outer radius may first be restored as follows:

$$r0_i(w, r_1) := r_1 \cdot x0\left(\frac{w}{r_1}\right)$$

$$r1_i(w, r_1) := r_1 \cdot x1\left(\frac{w}{r_1}\right)$$

Figure 4:
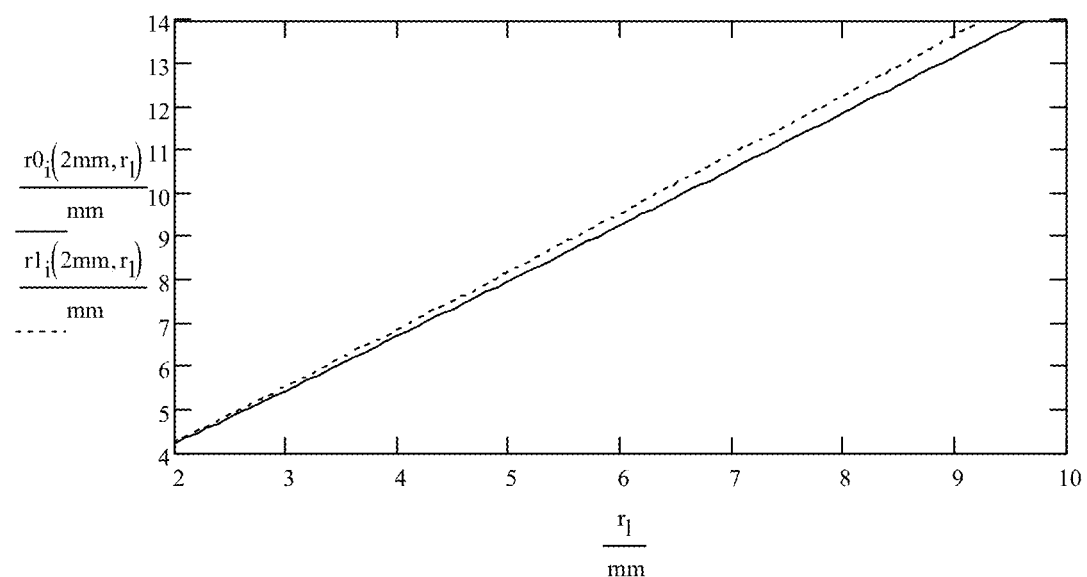
FIG. 4 is a graph illustrating relationships between lens radius and membrane anchor radius using extremes of strain balancing.

The resulting behavior is shown in FIG. 4. A piston width w of 2 mm has been assumed for the purposes of example.

It is clear that the difference in membrane design between these extreme cases is no more than a few percent in the region of interest shown in FIG. 4. The reason these extremes are attenuated so much is the presence of the cube root function in Equations 2, 5a and 5b. As a numerical example, when the clear aperture is 10 mm and the radial piston width is 2 mm, the membrane outer radius (or Inner Ring radius) varies by less than 3% when the strain is balanced at either high or low radius of curvature:

$$\frac{r1_i(2 \text{ mm}, 5 \text{ mm})}{r0_i(2 \text{ mm}, 5 \text{ mm})} = 1.028$$

Implementation of Strain Balancing

When strain balancing is implemented, the design of the fluid lens may be optimized for various objectives. To illustrate this, the membrane profile is graphically displayed in FIG. 5 in a way that facilitates design trade-off between Top Ring stroke and device footprint.

Figure 5:
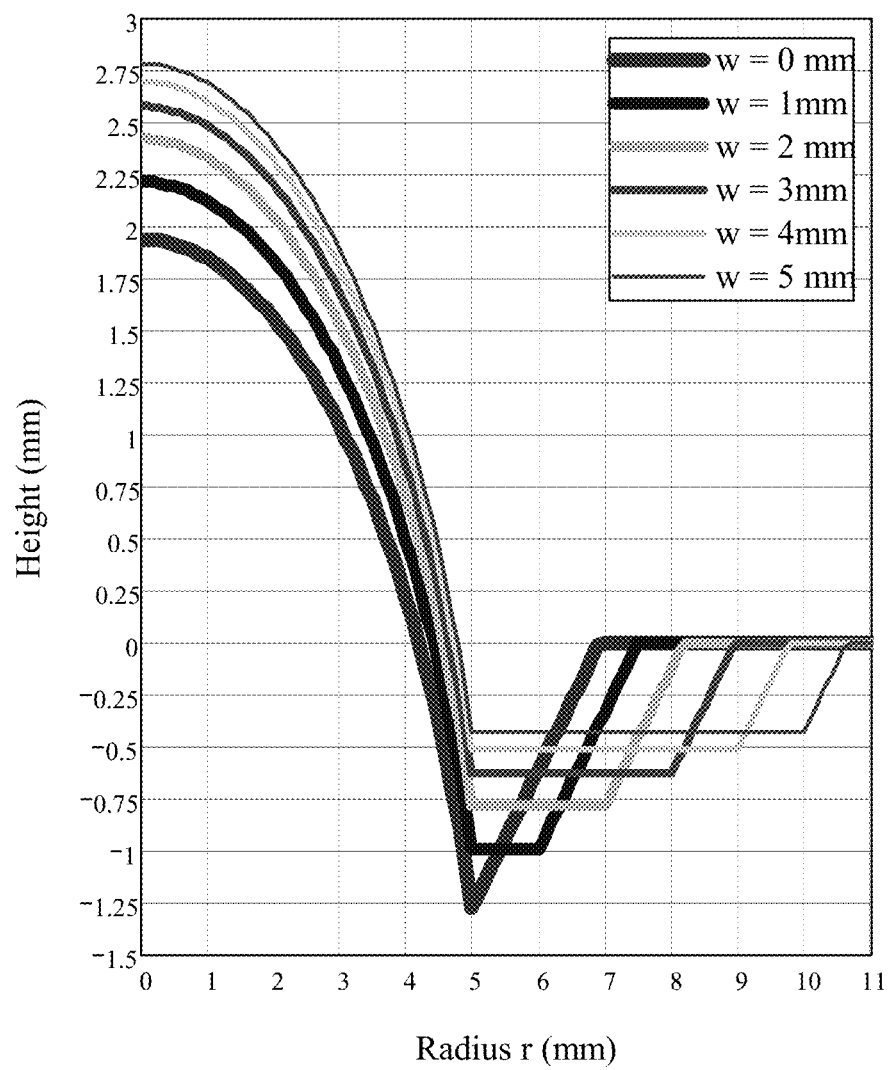
FIG. 5 is a graph illustrating membrane profiles for fluidic lenses with pistons of different widths.

In FIG. 5, fluidic lens membrane profiles are shown for lenses having pistons with different radial widths, thereby illustrating the effect of piston radial width on membrane profile It is noted that the lowest flat portion of each trace in FIG. 5 corresponds to the area where the piston face (e.g. the lower portion of the top ring) contacts the membrane. A height of zero designates a starting level of the membrane just before the Top Ring piston impinges on it. In this approximation, the amount of fluid initially contained in the lens is just sufficient to be contained by a flat membrane. A similar analysis may be carried out for alternatives where the initial membrane shape is either concave or convex. Conversely, by bonding the piston face to the membrane, it is possible to increase the achievable range of optical powers to encompass both positive and negative curvatures. By way of example, such bonding may be either adhesive based or may rely upon attraction between a magnetized Top Ring and a thin annular magnetic armature on the other side of the membrane. Either way, the figure clearly demonstrates that a larger piston allows a reduction in piston stroke for the same resulting optical power (or membrane radius of curvature).

Practical Applications

Figure 6:
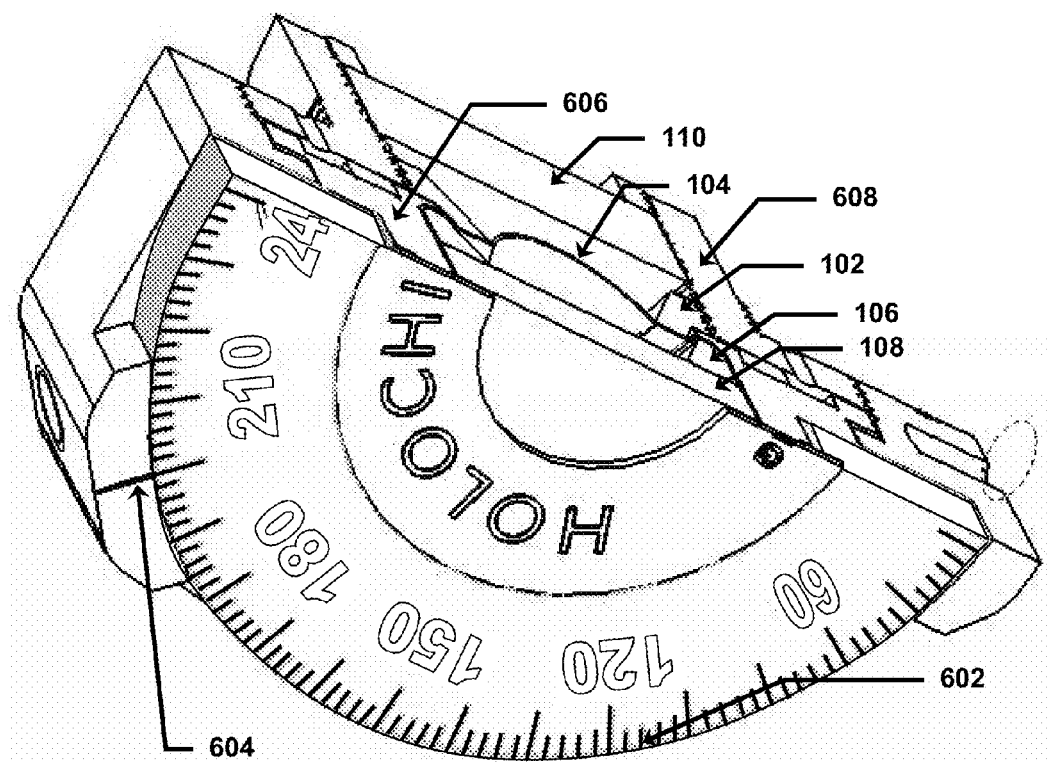
FIG. 6 is a three-dimensional cut-away diagram of a manually adjustable fluidic lens according to an embodiment of the present invention.

FIG. 6 shows the cross section of a manually adjustable fluidic lens 600 in accordance with an alternative embodiment of the present invention. In addition to the components first introduced in relation to FIG. 1, the fluidic lens 600 additionally includes a knurled Grip 602, bearing angular markings to be read against a Reference marking 604. The Grip 602 is manually rotatable by a user to adjust the optical power of the fluidic lens 600. The Grip 602 is mounted in fixed relationship to an Outer Ring 606. The Outer Ring 606, in turn, is slidably engaged with the Top Ring 102, so that a pure rotation of the former results in combined rotation and translation of the latter. The relative movement between the Top Ring 102 and the Membrane 104 is one of pure translation, whereby refractive adjustment is enabled without friction between these components.

Numerous variations of this structure are possible without departing from its essential inventive content. For instance, this device may be interfaced to the user's optical system by means of lens mounts engaging a Barrel portion 608 of the lens. This Barrel 608 may feature standardized threads, grooves or flats suitable for mating features of the lens mounts. Alternatively, screw threads may be provided to engage mounting posts. One such thread is shown in FIG. 6 near the Reference marking 604.

The force of gravity may present a challenge to fluidic lens that is not normally associated with conventional lenses. In particular, since the Fluidic Lens 100 is filled with a fluid, the shape of the membrane 104 may depend on the orientation of lens with respect to the force of gravity. Generally, gravity acts on the fluid in a way that causes the fluid to exert a greater fluid pressure on lower regions than on upper regions. The pressure differential generally does not present a problem if the Fluidic lens is held substantially horizontal. However, lenses are often used in a vertical or tilted orientation. In such a situation, the force of gravity acting on the Liquid 105 may lead to asymmetries in the shape of the Membrane 104. For example, if the Fluidic lens is oriented such that its optical axis is more or less horizontal, lower portions of the may be more convex more than upper portions. Such asymmetries may lead to lens aberrations, such as coma.

To counteract the effect of gravity on the liquid 105, the Membrane 104 may be pre-tensioned to a degree sufficient to counteract the effect of gravity. Pre-tensioning of the Membrane 104 may also serve to raise a resonant frequency of the Membrane 104 (and, hence of the Fluidic lens 100) thereby making them less susceptible to transient aberrations due vibrations or acceleration of the lens. The required degree of pre-tensioning may be determined empirically by measuring optical aberrations or susceptibility to vibration or acceleration as a function of membrane pre-tensioning. Preferably, the pre-tensioning of the Membrane is sufficient to overcome asymmetry in the shape of the Membrane 104 when the Fluidic Lens 100 is in a vertical or tilted orientation.

By way of example, and not by way of limitation, the Membrane 104 may be pre-tensioned before assembly with the other components of the Fluidic Lens 100. Specifically, the Membrane may be placed over the Outer Ring 606. A tension may be applied to the Membrane 104 in a radially symmetric fashion with respect to an optical axis of the Fluidic Lens 100. The Inner Ring 106 may then be placed on the Membrane 104 and the Liquid 105 may be placed in the aperture of the Inner Ring 106. The Back Window 108 may then be placed over the Inner Ring 106 with the Liquid 105 retained between the Membrane 104, the Inner Ring 106 and the Back Window 108. The Back Window 108 and Inner Ring 106 may then be pressed into the Outer Ring 606. Adhesive may optionally be placed on the edge of the Back Window 108 prior to pressing to secure the Membrane 104 in place and retain its pre-tensioned condition. Alternatively, the Membrane may be held in place by friction between the Inner Ring 106 and Outer Ring 606 if the fit between the Inner Ring 106 and the Outer Ring 608 is sufficiently tight.

Figure 7:
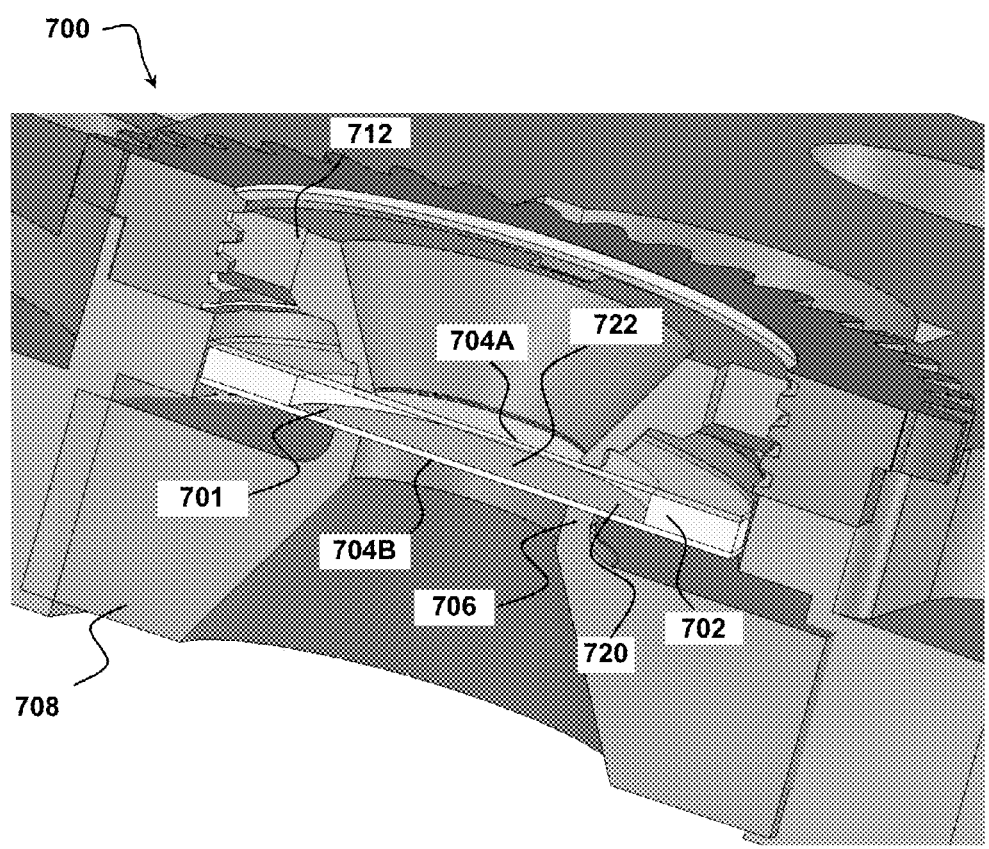
FIG. 7 is a three-dimensional cutaway drawing of a fluidic optical device that incorporates a liquid pill lens according to an embodiment of the present invention.

Other embodiments of the present invention may utilize a fluidic lens having a structure referred to herein as a liquid pill. The liquid pill is an example of a fluidic optical device wherein the aperture and reservoir are fully integrated with each other. As shown in FIG. 7, the structure of the liquid pill is very simple. A liquid pill lens 700 includes a cavity formed by a perforated spacer 702 and two membranes (also referred to as "optical surfaces") 704A, 704B. The spacer 702 may be similar or identical in form to the inner ring 6708 of FIG. 67A of parent application Ser. No. 11/383,216, which has been incorporated herein by reference. An interior volume 701 enclosed between the spacer 702 and upper and lower membranes 704A, 704B is filled with a fluid having convenient optical, mechanical and chemical properties. Although in the example depicted in FIG. 7 the interior volume 701 is shaped as a circular cylinder, the outer boundary may take various shapes such as circular, square, rectangular or odd. The liquid pill lens 700 may be mechanically actuated using a mechanism similar to that described above. For example, a circular rim 706 protruding from a passive retainer 708 (shown near the bottom of FIG. 7) may contact the lower compliant membrane 704B. The liquid pill lens 700 may be lowered or raised at will by a top ring 712 or any other suitable actuator. Upon actuation of the liquid pill lens 700, the circular rim 706 presses against the membrane 704B. The circular rim 706 divides the fluid-filled interior volume 701 into reservoir 720 and aperture portions 722 as it engages the membrane 704B. The squeezing action of the retainer 708 and top ring 712 causes an aperture portion of membrane 704B within the circular rim 706 to bulge, thus controlling the refractive power of the liquid pill lens 700. By bonding the circular rim 706 to the membrane, it is possible to increase the achievable range of optical powers to encompass both positive and negative curvatures. For example, the membrane 704B can deform in either a convex or concave fashion depending on whether a net positive or negative pressure is applied to the fluid in the reservoir 701.

Adjustable fluidic lenses according to embodiments of the present invention may be used in numerous ways by optical researchers, engineers and other users of optical systems. Other uses include telescopes of civilian and military use, medical systems such as used by optometrists to test the vision of patients, etc.

Insofar as the description above and the accompanying drawing disclose any additional subject matter that is not within the scope of the single claim below, the inventions are not dedicated to the public and the right to file one or more applications to claim such additional inventions is reserved.

Any feature described herein, whether preferred or not, may be combined with any other feature, whether preferred or not.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any feature described herein, whether preferred or not, may be combined with any other feature, whether preferred or not.

What is claimed is:

1. A fluidic lens, comprising: a reservoir at least partially bounded by a first optical surface and a second optical surface;
a fluid;
wherein the fluid fills a volume of the reservoir;
a rim configured to contact a portion of the first or second optical surface from outside the reservoir, wherein one or more of the first optical surface or second optical surface is configured to deform as a result of a change in a pressure applied to the fluid or a change in contact between the rim and the first or second optical surface, wherein the reservoir is configured to be brought into said contact with the rim and/or the rim is configured to be brought into said contact with the reservoir.

2. The fluidic lens of claim 1 wherein the rim is circular.

3. The fluidic lens of claim 1 wherein the rim divides the fluid-filled volume of the reservoir into an aperture portion and a reservoir portion.

4. The fluidic lens of claim 1 wherein the rim is bonded to an optical surface.

5. The fluidic lens of claim 1 wherein the reservoir is configured to be translated with respect to the rim and/or the rim is configured to be translated with respect to the reservoir;
wherein said translation results in said change in a pressure and said deformation of an optical surface.

6. The fluidic lens of claim 1 wherein an optical surface is pre-tensioned.

7. The fluidic lens of claim 1 further comprising an actuator;
wherein said actuator is configured to provide said change in a pressure.

8. The fluidic lens of claim 7, wherein the actuator is selected from the group of shape memory alloy actuators, electroactive polymer actuators, electrostatic actuators, piezoelectric actuators, stepper motors, voice coils, motor actuators and electromagnetic actuators.

9. The fluidic lens of claim 1 further comprising a rotatable member;
wherein said rotatable member is configured to provide said change in a pressure.

10. The fluidic lens of claim 1 wherein one or more of the first or second optical surface includes one or more of a silicone-based polymer, polyester material, glass, plastic, polymer, or polycarbonate.

11. A fluidic lens, comprising:
a reservoir at least partially bounded by a first optical surface and a second optical surface;

a fluid;

wherein the fluid fills a volume of the reservoir, wherein a rim divides the fluid-filled volume of the reservoir into an aperture portion and a reservoir portion, wherein a portion of the rim is bonded to a portion of the first or second optical surface;

wherein one or more of the first optical surface or second optical surface is configured to deform as a result of a change in a pressure of the fluid;

a piston member disposed for contacting an optical surface wherein the reservoir is configured for translational motion relative to the piston, or the piston is configured for translational motion relative to the reservoir;

wherein said translational motion and said contact between the piston and an optical surface results in said change in pressure and said deformation of the first or second optical surface.

12. The fluidic lens of claim 11 wherein an optical surface is pre-tensioned.

13. The fluidic lens of claim 11 further comprising an actuator;

wherein said actuator is configured to provide one or more of said translational motion or said change in a pressure.

14. The fluidic lens of claim 13, wherein the actuator is selected from the group of shape memory alloy actuators, electroactive polymer actuators, electrostatic actuators, piezoelectric actuators, stepper motors, voice coils, motor actuators and electromagnetic actuators.

15. The fluidic lens of claim 11 further comprising a rotatable member;

wherein said rotatable member is configured to provide one or more of said translational motion or said change in a pressure.

16. The fluidic lens of claim 11 wherein one or more of the first or second optical surface includes one or more of a silicone-based polymer, polyester material, glass, plastic, polymer, or polycarbonate.

* * * * *